Feb. 13, 1940.    J. BOSSART    2,190,093
SUSPENSION SYSTEM FOR A CAMERA AND LIGHT STAGE
Filed June 23, 1939    4 Sheets-Sheet 2

Inventor
John Bossart
By Lyon & Lyon
Attorneys

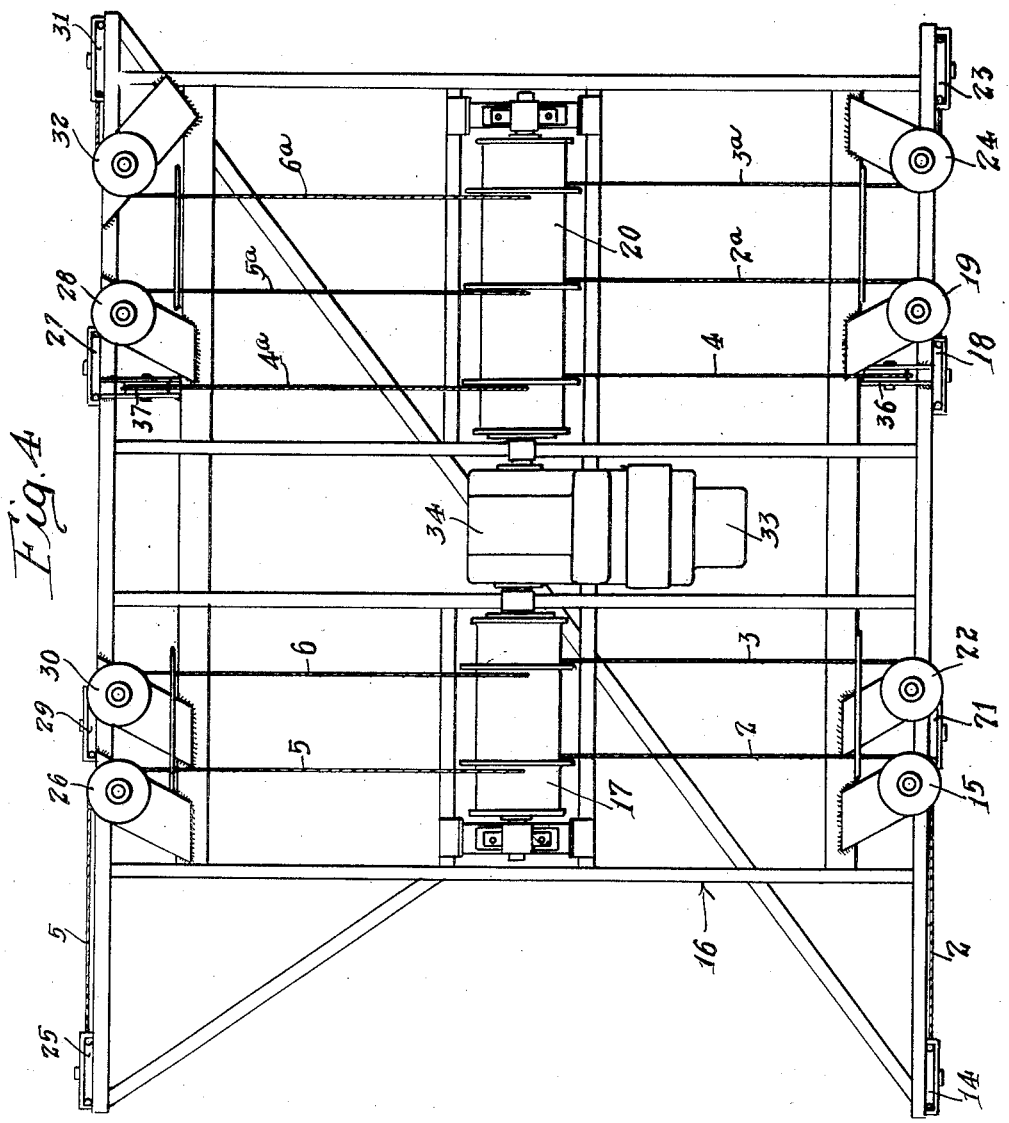

Feb. 13, 1940.  J. BOSSART  2,190,093
SUSPENSION SYSTEM FOR A CAMERA AND LIGHT STAGE
Filed June 23, 1939  4 Sheets-Sheet 4
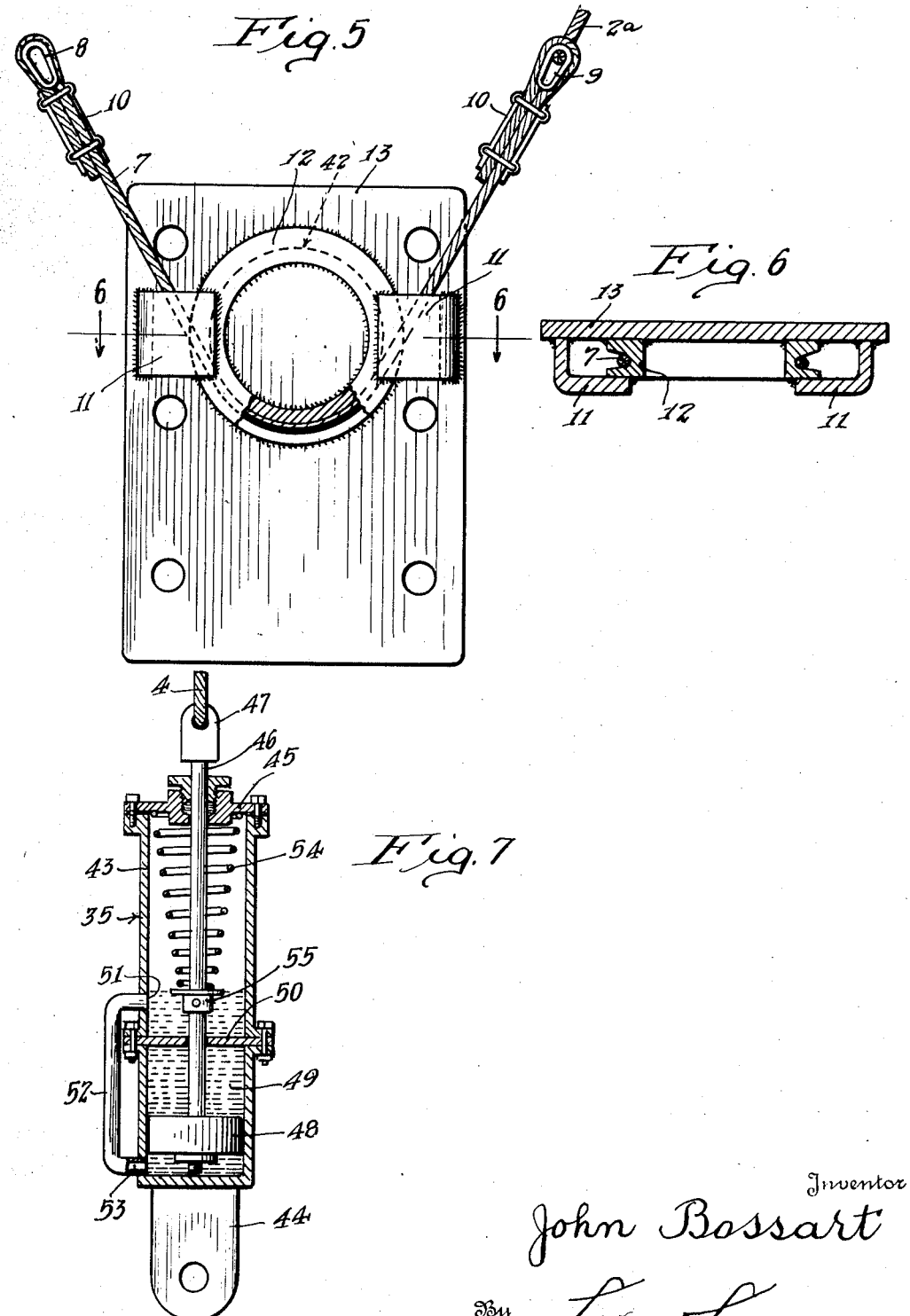
Inventor
John Bossart
By Lyon+Lyon
Attorneys Patented Feb. 13, 1940

2,190,093

UNITED STATES PATENT OFFICE 2,190,093

SUSPENSION SYSTEM FOR A CAMERA AND LIGHT STAGE

John Bossart, Los Angeles, Calif., assignor to Loew's Incorporated, a corporation of Delaware Application June 23, 1939, Serial No. 280,762

7 Claims. (Cl. 304—17)

My invention relates to a suspension system for a mobile stage for use in carrying cameras and lights during filming of motion pictures. The type of stages now in use are of the fixed type. They are built in place with scaffolding, or are carried on overhead runners to a certain position and there fixed stationary by means of guy wires or scaffolding timbers. My invention does away with the use of all scaffolding or rigidly fastened guy wires.

In photographing motion pictures, the lights and cameras are often used in an overhead position. They must be held in a rigid position so that there is no motion imparted to them and the stage carrying them must not sway. The lights used are usually arc lights which have to be periodically adjusted by a light man. His motions on the stage from one light to the other are quick and the stage carrying these lights must not move when the light man runs across it.

It is therefore, an object of my invention to provide a suspension system for a stage, carrying lights or cameras, which will prevent motion of the stage.

Another object of my invention is to provide a suspension system for a light or camera stage that will permit the stage to be readily raised or lowered or moved horizontally.

Other objects and advantages will be apparent from a study of the following specification.

In describing the invention, reference will be had to the appended drawings, in which Fig. 1 is a side view of the suspension system for the mobile stage.

Fig. 4 is a plan view of the carrier from which the stage is suspended.

Fig. 5 is a detail view of the means for attaching the suspension cables.

Fig. 6 is a sectional view taken on the line 6—6 of Fig. 5.

Fig. 7 is a sectional view of the hydraulic ram by which the rear suspension cables are attached to the stage.

Figure 1:
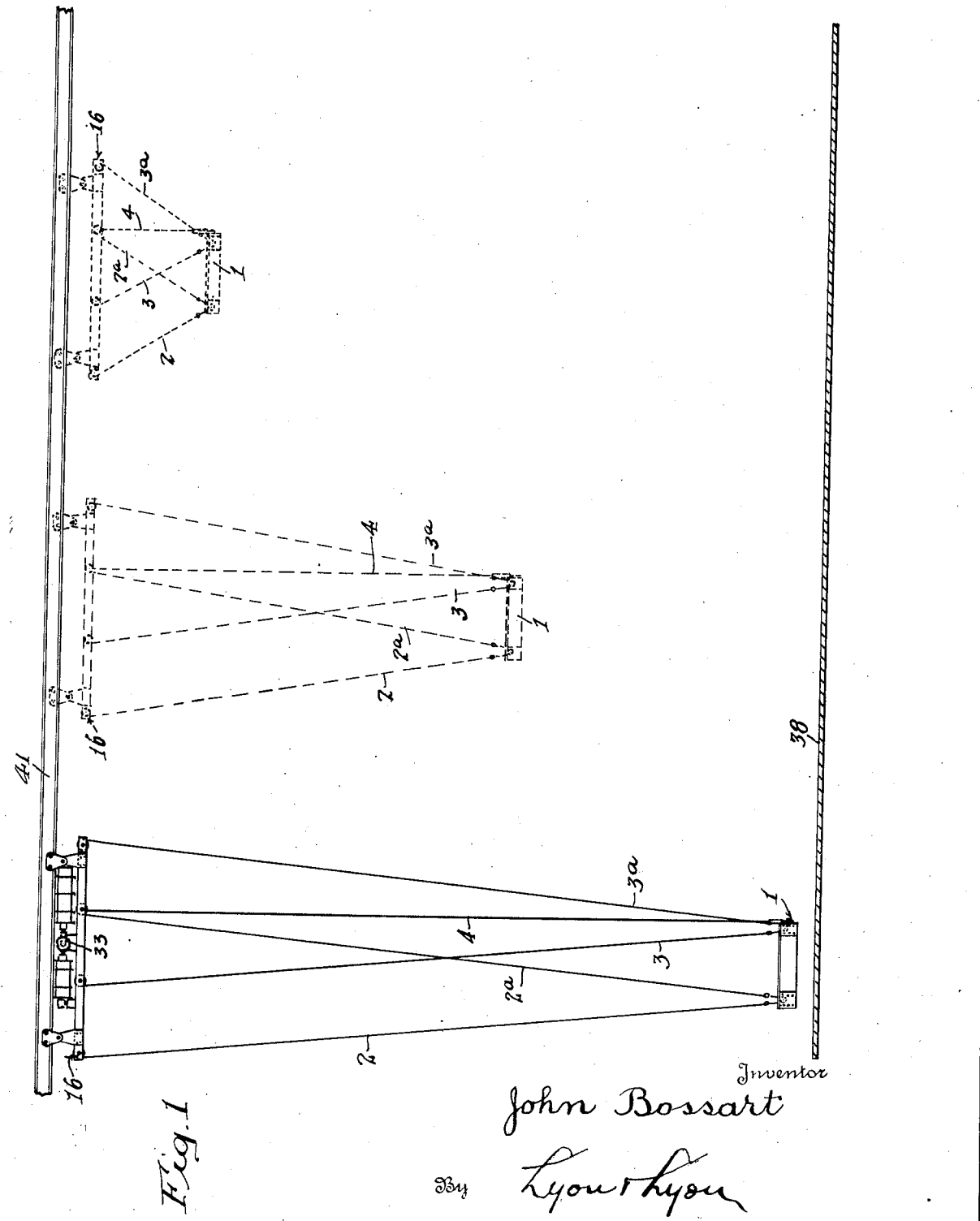

The stage 1, suspended in accordance with my invention, is shown in Fig. 1 in three positions. This stage 1 may be an ordinary wooden frame with board planking. The stage is supported by four pairs of paired cables 2—2a, 3—3a, 5—5a and 6—6a, and a pair of rear cables 4—4a. Cables 2—2a and 3—3a are attached to the right side of the stage 1 adjacent to the corners and cables 4—4a are attached to the rear of the stage near the center; cables 5—5a and 6—6a are attached to the left side adjacent to the corners. Cables 2—2a are attached adjacent to one of the corners of the stage by means of the bridle 7 composed of a short piece of cable having eyes 8 and 9 formed by looping the ends thereof and applying cable clamps 10. Cable 2 has a similar eye which engages with eye 8, and cable 2—a is similarly attached to eye 9. The bridle 7 passes through the cable stops 11 and around the pulley 12 which is nonrotatably mounted by welding or bolting to plate 13. The plate 13 is bolted adjacent to the corners of stage 1. In a like manner cables 3—3a, 5—5a and 6—6a are attached adjacent to the other three corners of the stage 1.

The other end of the cable 2 passes through the rotatable pulleys 14 and 15 mounted on the carrier 16 to the drum 17, where it is fastened by any suitable means. The cable 2—a similarly passes through the rotatable pulleys 18 and 19 to the drum 20, where it is attached. The cable 3 passes through the rotatable pulleys 21 and 22 to the drum 17, where it is attached. The cable 3—a passes through the rotatable pulleys 23 and 24 to the drum 20, where it is attached. The cables 5—5a, 6—6a similarly run through the corresponding pulleys 25, 26, 27, 28, 29, 30, 31 and 32, and are attached to the drums 17 and 20 in the opposite directions to cables 2—2a and 3—3a, so that rotation of the drums 17 and 20 will cause all the cables to be either reeled in or out simultaneously.

The drums 17 and 20 are driven in the same direction and at the same speed by the reversible motor 33 by means of a gear system enclosed in a housing 34. The drums 17 and 20 have the same diameters so as to wind all the cables in or out the same amount at the same speed.

The drums 17 and 20 must have separate sections for all the cables to be wound on so that there will be no overlapping. Cables 4—4a are attached to the rear of the stage 1 by means of a hydraulic ram 35, to be hereinafter described. The other end of the cables 4—4a run to the drum 20 by way of pulleys 36 and 37 and are fastened to the drum 20 so that they are both wound in or out at the same speed and in the same direction as the cables 2—2a, etc.

The diameters of the pulleys 14, 18, 21 to 23, 25, 27, 29 and 31 must be the same and the distance between pulleys 14 and 18 and pulleys 21 and 23, and similarly pulleys 25 and 27, and 29 and 31, must be the same. By so spacing the pulleys the angle between cables 2—2a is the same angle as between any other pair of cables, such as 3—3a or 5—5a. The pulleys 36 and 37 must be so spaced as to cause the angle between the cables 4—4a to be the same as 2—2a. It then becomes apparent that the rotation of the drums 17 and 20 will cause all ten cables to be wound in or out the same amount and each cable will be taut. The drums 17 and 20 must be matched in diameter.

It is readily apparent that all of the supporting cables are at an angle from the vertical and will thus cross-brace the stage and prevent swaying. The side cables 2—2a, 3—3a, 5—5a and 6—6a prevent back and forth movement and the rear cables 4—4a prevent side motion.

The size of the carrier 16 is preferably larger at its extremities than the stage 1 as this causes the cables to be further apart and causes wider angles with each other. Also if the pulleys 14 and 25 are not in a vertical plane with the front of the stage 1, a lateral bracing will be achieved by these cables which cooperate with the lateral bracing of the rear cables 4—4a. However this angle from a vertical plane and the sides of stage 1 must be the same on both sides and the rear cables must have the same angle; otherwise they will not hoist and lower simultaneously. An increase in this angle will give greater stability.

Because of the lessening of the angle between the cables as the stage is lowered, there is more tendency for it to sway. When the stage is raised to its highest position, the angles become so great that swaying is totally eliminated. To prevent disarrangement of the cables, I prefer never to lower the stage into contact with the floor 38, but always to maintain it at least two feet thereabove.

Figure 2:
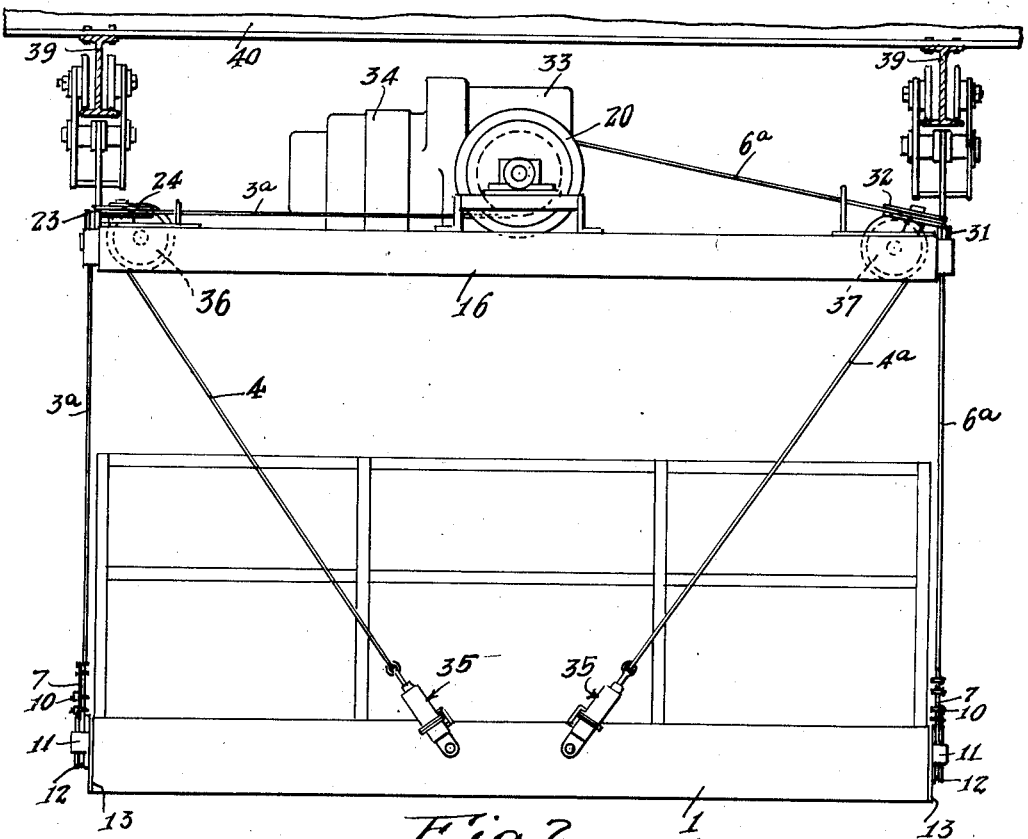
Fig. 2 is a rear view of the stage in an elevated position.
Figure 3:
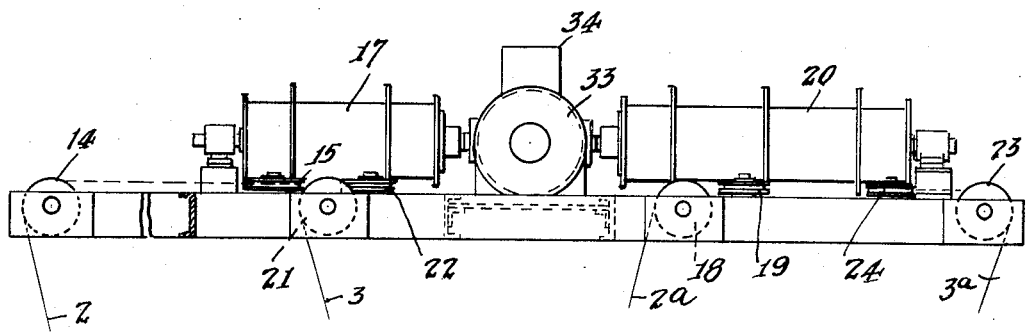
Fig. 3 is a front view of the movable carrier.

The carrier 16 is attached to the overhead track 39 by rollers commonly used in the art. The track may be a special track attached to the cross beams 40, as shown in Fig. 2, or a simple beam 41 as shown in Fig. 1. Methods of supporting the carrier 16 from an overhead track are well known in the art, and any of the different means may be used. Of course if the stage 1 is to be used for cameras, the overhead track and rollers will have to be of the type having a very smooth rolling surface and little friction. A carrier suspended in this way permits the stage to be moved horizontally.

It is apparent that the cables supporting the stage 1 will not have a micrometer even thickness, even though this is desirable. Therefore to prevent a cable 2 with a larger thickness from causing its corresponding cable 2—a to become slack, I have made the pulley 12 rigid and nonrotating. If the cable 2 becomes tighter than the cable 2—a the bridle 7 will slip in the groove 42 of the pulley 12 and equalize the load on the cables. If these cables were made rotatable, the action of a person walking across the stage 1 would cause the pulley to rotate and change the tension on the cable, and thus cause a swaying of the stage.

To prevent accident if one cable breaks, I have provided the pulley guard 11 which is welded in the form of a loop to the pulley 12 and the plate 13. If the cable breaks, the bridle 7 will slip through the pulley until the cable clamp 10 engages the pulley guard 11 and will then stop. Thus in this way the corner with the broken cable will still be supported by one of the paired cables.

Any slight variance in the length of one pair of cables, such as 2—2a, and the length of another of the paired cables, such as 3—3a, caused by slight differences in the diameters of the cables, will be taken care of by a slight twisting of the wooden platform composing the stage 1. Any variance between two pairs of paired cables will not cause more than a fraction of an inch rise or fall of a corner of the stage and the twisting of the wooden platform is sufficient to take care of this difference in length.

To prevent a change in the tension of cables 4—4a and thus produce sway in the stage 1, these cables are attached to the stage by means of hydraulic rams 35 which will prevent the sudden motion of an operator on the stage from moving them. The hydraulic rams 35 are composed of a cylinder 43 having one end sealed and a flange 44 thereon for bolting to the rear of the stage. On the upper end of the cylinder 43 is a suitable closure member 45 having a passage through its center for a piston rod 46.

The piston rod 46 has on its outer end a lug 47 for attaching the cable 4 and at its other end a piston 48. The piston 48 is immersed in oil or water 49 contained in the cylinder 43. A diaphragm 50 is placed in the cylinder intermediate the piston 48 and the top entrance 51 of a return pipe 52. The lower entrance to the pipe 52 is below the piston.

A heavy spring 54 is placed around the piston rod 46 with its lower end engaging a collar 55 on the piston rod 46 and its upper end engaging the closure member 45. If a sudden tension is placed on the cable, it will be transmitted by way of the lug 47 to the piston rod 46 and the piston 48 which will very slowly move upward in the cylinder 43 because of leakage between the piston rod 48 and the cylinder 43. The motion of the piston 48 will therefore be very slow and prevent any sudden lengthening of the cable 4 and motion of the stage 1. Likewise if the motion is in the other direction, the spring 54 will likewise force the piston 48 downward and the leakage will permit slow motion.

While I have shown and described the preferred embodiments of my invention, I do not wish to be limited to any details herein described, except as defined in the appended claims.

I claim:

1. In a supporting system for a movable stage, the combination of a carriage and a rectangular stage, said stage having four sets of paired cables attached to two opposite sides of said stage adjacent the corner, the paired cables supported from said carriage at equal distances so that the two cables of said paired cables make an angle between cables and the angle between any two cables of a pair is equal to the angle between the cables of any other pair, a pair of cables adjacent either of the remaining sides of the stage, and extending in a plane at right angles to the plane of the other pair of cables and supported from the carriage so that the angles between them are equal to the angles between the two cables of any other pair.

2. In a supporting system for a movable stage, the combination of a carriage and a rectangular stage, said stage having four sets of paired cables attached to two opposite sides of said stage adjacent the corner, the paired cables supported from said carriage at equal distances so that the two cables of said paired cables make an angle between cables and the angle between any two cables of a pair is equal to the angle between the cables of any other pair, a pair of cables adjacent either of the remaining sides of the stage and supported from the carriage so that the angles between them are equal to the angles between the two cables of any other pair, and a bridle for said paired cables and a nonrotatable pulley around which said bridle passes.

3. In a supporting system for a movable stage, the combination of a carriage and a rectangular stage, said stage having four sets of paired cables attached to two opposite sides of said stage adjacent the corner, the paired cables supported from said carriage at equal distances so that the two cables of said paired cables make an angle between cables and the angle between any two cables of a pair is equal to the angle between the cables of any other pair, a pair of cables adjacent either of the remaining sides of the stage and supported from the carriage so that the angles between them are equal to the angles between the two cables of any other pair, a bridle for said paired cables, a nonrotatable pulley around which said bridle passes, and cable stop means.

4. In a supporting system for a movable stage, the combination of a carriage and a rectangular stage, said stage having four sets of paired cables attached to two opposite sides of said stage adjacent the corner, the paired cables supported from said carriage at equal distances so that the two cables of said paired cables make an angle between cables and the angle between any two cables of a pair is equal to the angle between the cables of any other pair, a pair of cables adjacent either of the remaining sides of the stage and supported from the carriage so that the angles between them are equal to the angles between the two cables of any other pair, a bridle for said paired cables, a nonrotatable pulley around which said bridle passes, and a hydraulic ram between the last described cables and the stage.

5. In a supporting system for a movable stage, the combination of a carriage and a rectangular stage, said stage having four sets of paired cables attached to two opposite sides of said stage adjacent the corners, the paired cables supported from said carriage at equal distances so that the two cables of said paired cables make an angle between cables and the angle between any two cables of a pair is equal to the angle between the cables of any other pair, a pair of cables adjacent either of the remaining sides of the stage and supported from the carriage so that the angles between them are equal to the angles between the two cables of any other pair, and a hydraulic ram between the last described cables and the stage.

6. In a supporting system for a movable stage, the combination of a carriage and a rectangular stage, said stage having paired cables attached to the two sides of said stage adjacent the corners, the paired cables supported from said carriage at equal distances so that the two cables of said paired cables have an angle between said cables and the angle between any two cables of a pair is equal to the angle between the cables of any other pair, a pair of cables attached to either of the remaining sides of the stage extending in a plane at right angles to the plane of the other pair of cables and supported from the carriage so that the angles between them are equal to the angles between the two cables of any of said paired cables, said paired cables at an angle from a vertical plane and the plane of the sides of the stage they are attached to and all of the other cables lying in a plane, making a corresponding angle.

7. In a supporting system for a movable stage, the combination of a carriage and a rectangular stage, said stage having paired cables attached to the two sides of said stage adjacent the corners, the paired cables supported from said carriage at equal distances so that the two cables of said paired cables have an angle between said cables and the angle between any two cables of a pair is equal to the angle between the cables of any other pair, a pair of cables attached to either of the remaining sides of the stage and supported from the carriage so that the angles between them are equal to the angles between the two cables of any of said paired cables, said paired cables at an angle from a vertical plane and the plane of the sides of the stage they are attached to and all of the other cables lying in a plane, making a corresponding angle, and nonrotatable pulleys to which said paired cables are attached.

JOHN BOSSART.